US 9,398,133 B2

(12) United States Patent
Jo

(10) Patent No.: US 9,398,133 B2
(45) Date of Patent: Jul. 19, 2016

(54) MOBILE TERMINAL AND CONTROL METHOD FOR THE SAME

(75) Inventor: Sunghee Jo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 519 days.

(21) Appl. No.: 13/452,482

(22) Filed: Apr. 20, 2012

(65) Prior Publication Data
US 2013/0082945 A1   Apr. 4, 2013

(30) Foreign Application Priority Data
Oct. 4, 2011   (KR) .................... 10-2011-0100898

(51) Int. Cl.
G06F 3/041 (2006.01)
H04M 1/67 (2006.01)
G06F 3/0488 (2013.01)

(52) U.S. Cl.
CPC ............. *H04M 1/67* (2013.01); *G06F 3/04883* (2013.01); *H04M 2250/22* (2013.01)

(58) Field of Classification Search
CPC ... G06F 3/048; G06F 3/0481; G06F 3/04817; G06F 3/0484; G06F 3/04842
See application file for complete search history.

(56) References Cited

U.S. PATENT DOCUMENTS

| 8,581,877 | B2 * | 11/2013 | Yoo ............................... 345/174 |
| 2008/0083015 | A1 * | 4/2008 | Kim ................................. 726/2 |
| 2009/0006991 | A1 * | 1/2009 | Lindberg et al. ............... 715/763 |
| 2010/0269040 | A1 * | 10/2010 | Lee ................................ 715/702 |
| 2011/0105193 | A1 * | 5/2011 | Lee et al. ....................... 455/566 |
| 2011/0316797 | A1 * | 12/2011 | Johansson ....................... 345/173 |
| 2012/0036556 | A1 * | 2/2012 | LeBeau et al. ..................... 726/3 |
| 2012/0069231 | A1 * | 3/2012 | Chao ........................ 348/333.01 |
| 2012/0174042 | A1 * | 7/2012 | Chang ............................ 715/863 |
| 2013/0283212 | A1 | 10/2013 | Zhu et al. |

FOREIGN PATENT DOCUMENTS

| CN | 101699835 A | 4/2010 |
| CN | 102043587 A | 5/2011 |
| CN | 102075619 A | 5/2011 |
| CN | 201859426 U | 6/2011 |
| EP | 2 547 079 A1 | 1/2013 |
| WO | WO 2010/040670 A2 | 4/2010 |

* cited by examiner

*Primary Examiner* — Kathy Wang-Hurst
*Assistant Examiner* — Peijie Shen
(74) *Attorney, Agent, or Firm* — Birch, Stewart, Kolasch & Birch, LLP

(57) ABSTRACT

The present disclosure relates to a mobile terminal for allowing a touch input and control method thereof. A mobile terminal according to an embodiment of the present disclosure may include a display unit configured to display a lock screen in a lock state in which a control command input to an application is restricted, and a controller configured to display at least one object on the lock screen when a first touch input sensed on the lock screen corresponds to set criteria, and display an execution screen corresponding to any one of the displayed objects based on the first touch and a sequentially entered second touch input.

11 Claims, 14 Drawing Sheets

MOBILE TERMINAL AND CONTROL METHOD FOR THE SAME

RELATED APPLICATION

Pursuant to 35 U.S.C. §119(a), this application claims the benefit of earlier filing date and right of priority to Korean Application No. 10-2011-0100898, filed on Oct. 4, 2011, the contents of which is incorporated by reference herein in its entirety.

BACKGROUND OF THE INVENTION

1. Field of the Invention

The present disclosure relates to a mobile terminal for allowing a touch input and control method thereof.

2. Description of the Related Art

A mobile terminal may be configured to perform various functions. The examples of such various functions may include a data and voice communication function, a function of capturing still or moving images through a camera, a voice storage function, a function of playing music files through a speaker system, an image or video display function, and the like. Some mobile terminals may include an additional function capable of implementing games, and some other mobile terminals may be implemented as a multimedia player. Moreover, recent mobile terminals may receive broadcast or multicast signals, thereby allowing a user to view video or television programs.

Furthermore, efforts for supporting and enhancing the functions of the mobile terminal have been continued. The foregoing efforts may include the improvement of software and hardware as well as the change or improvement of structural elements constituting a mobile terminal.

Furthermore, a mobile terminal for receiving a control command from a user through a touch screen included in the mobile terminal may implement a lock state for limiting a user's control command input to prevent a touch input unintended by the user.

However, in order to enter a specific application in a lock state, there is an inconvenience that the user should input a prescribed condition to release the lock state, and then select and enter the corresponding application.

SUMMARY OF THE INVENTION

An objective of the present disclosure is to provide a mobile terminal and control method thereof for directly entering an application to be used by a user in a lock state.

In order to accomplish the foregoing objective, a mobile terminal according to an embodiment of the present disclosure may include a display unit configured to display a lock screen in a lock state in which a control command input to an application is restricted, and a controller configured to display at least one object on the lock screen when a first touch input sensed on the lock screen corresponds to set criteria, and display an execution screen corresponding to any one of the displayed objects based on the first touch and a sequentially entered second touch input.

In an embodiment, the set criteria may be defined such that the first touch input is entered on a first position located on a preset path for releasing the lock state.

In an embodiment, the first touch input may be a drag input from a start position to the first position on the preset path.

In an embodiment, the execution screen may be an execution screen of an application corresponding to an object displayed on the preset path to which the second touch input is applied.

In an embodiment, the second touch input may be a touch input sequentially entered from the first touch input to a release point for generating an unlock command to release the lock state, and the first and the second touch input may be applied on the preset path for releasing the lock state.

In an embodiment, there may exist a plurality of the preset paths, and the execution screen may be an execution screen of an application corresponding to an object displayed on a path at which the second touch input is applied among the plurality of paths.

In an embodiment, a plurality of objects displayed on the plurality of paths may be displayed at each release point included in the plurality of paths, respectively.

In an embodiment, a plurality of objects may be displayed on the lock screen, and the execution screen may be an execution screen of an application corresponding to an object located at a position for releasing the second touch input among the plurality of objects.

In an embodiment, the lock state may be released when entering a touch corresponding to any one of a plurality of preset patterns, and objects corresponding to the plurality of patterns, respectively, may be displayed on the lock screen when the first touch input is applied to a first position included in any one of the plurality of patterns.

In an embodiment, the first touch input may be a touch input applied to correspond to the any one pattern from a start position of the any one pattern to the first point.

In an embodiment, the second touch input may be a touch input sequentially applied from the first touch input to correspond to the any one pattern, and the controller may display the execution screen of an application associated with an object corresponding to the any one pattern when the second touch input is applied.

In an embodiment, the object may be displayed on the path of a pattern to which the first touch input is applied among the plurality of patterns.

In an embodiment, objects corresponding to the plurality of patterns, respectively, may be displayed at start or end positions of the plurality of patterns, respectively, and the start position may be a point from which a touch input to a pattern for releasing the lock state is started, and the end position may be a point at which a touch input to a pattern for releasing the lock state is ended.

In an embodiment, at least one of guide images and objects corresponding to the plurality of patterns may be displayed on the lock screen based on the user's selection.

In an embodiment, the controller may set a condition for displaying the execution screen when a kind of application corresponding to the displayed object corresponds to set criteria.

In an embodiment, the condition may be an input of the set number or set touch.

In an embodiment, the mobile terminal may further include a detection unit configured to detect a displayable object on the lock screen, wherein the detection unit detects an object corresponding to any one of an application in which an event has occurred during the lock state, an application that has been executed prior to entering the lock state, a preset application to be displayed on the lock state, and an application being executed in the lock state, based on set criteria.

In an embodiment, the object may be an icon of the any one application.

A method of controlling a mobile terminal according to an embodiment of the present disclosure configured to display a lock screen in a lock state in which a control command input to an application is restricted may include determining whether a touch input sensed on the lock screen corresponds to set criteria, displaying at least one object on the lock screen when the touch input corresponds to the set criteria as a result of the determination, and displaying an execution screen corresponding to any one of the displayed objects based on the touch input and a sequentially entered touch input.

In an embodiment, a touch input corresponding to the set criteria may be entered from a start position on a preset path for releasing the lock state to a preset point.

In an embodiment, there may exist a plurality of preset paths, and the objects may be located on the plurality of paths, respectively, and the execution screen may correspond to an object located on a path at which the touch input is sensed among the plurality of paths.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
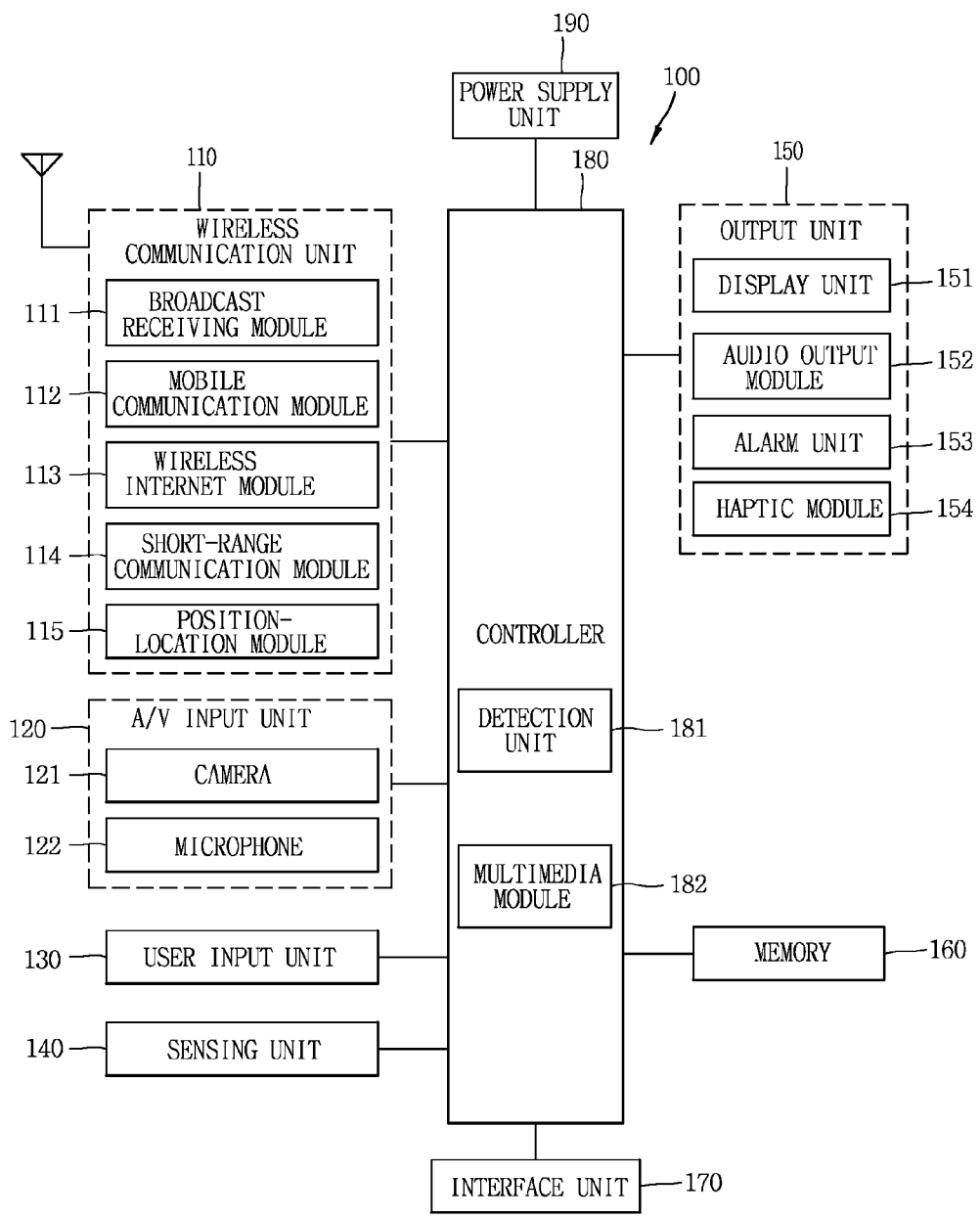
FIG. 1 is a block diagram illustrating a mobile terminal according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the technological spirit disclosed herein by the accompanying drawings.

A mobile terminal disclosed herein may include a portable phone, a smart phone, a laptop computer, a digital broadcast terminal, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal according to an embodiment disclosed herein.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The mobile communication module 112 may be configured to implement an video communication mode and a voice communication mode. The video communication mode refers to a configuration in which communication is made while viewing an image of the counterpart, and the voice communication mode refers to a configuration in which communication is made without viewing an image of the counterpart. The mobile communication module 112 may be configured to transmit or receive at least one of voice or image data to implement the video communication mode and voice communication mode.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an interlayer structure (hereinafter, referred to as a "touch screen"), the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The examples of the proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 for reproducing multimedia data. The multimedia module 181 may be implemented in an integrated manner within the controller 180 or may be implemented in a separate manner from the controller 180.

Furthermore, the controller 180 can perform a pattern recognition processing so as to recognize writing or drawing input on the touch screen as text or image.

Furthermore, the controller 180 may implement a lock state for limiting the user's control command input to applications when the state of the mobile terminal satisfies the prescribed condition. Furthermore, the controller 180 may control a lock screen displayed in the lock state based on a touch input sensed over the display unit 151 (hereinafter, referred to as a "touch screen") in the lock state.

The power supply unit 190 receives external power and internal power under the control of the controller 180 to provide power required by various components.

Various embodiments described herein may be implemented in a medium that can be read by a computer or similar device using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules. The software modules may perform at least one function or operation described herein.

Software codes can be implemented by a software application written in any suitable programming language. The software codes may be stored in the memory 160 and executed by the controller 180.

Hereinafter, a mobile terminal according to an embodiment of the present disclosure described in FIG. 1, or a mobile terminal disposed with constituent elements of the mobile terminal, or the structure of a mobile terminal will be described.

Figure 2A:
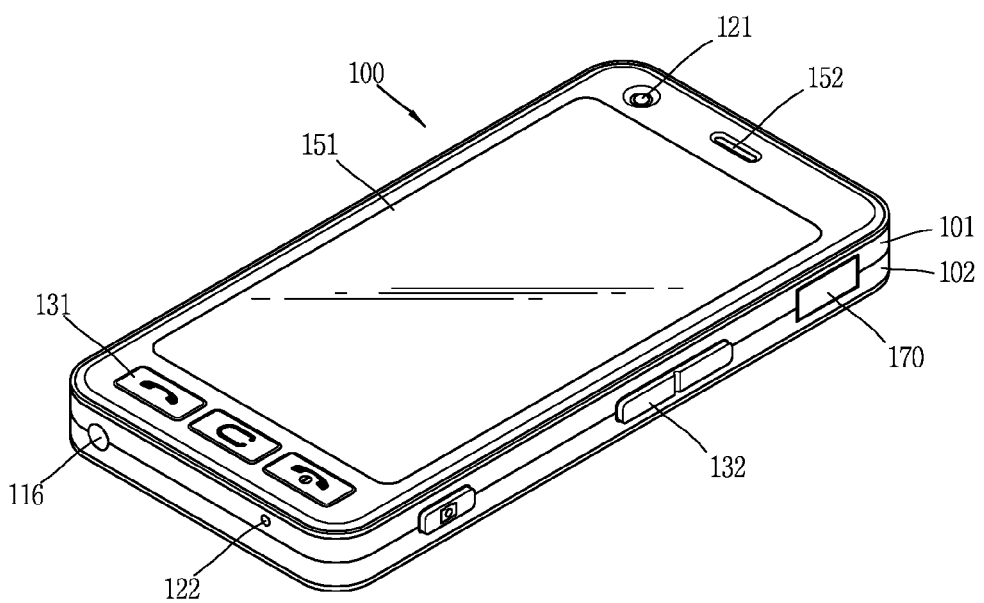
FIGS. 2A and 2B are a front and a rear perspective view, respectively, illustrating an example of a mobile terminal according to an embodiment of the present disclosure.
Figure 2B:
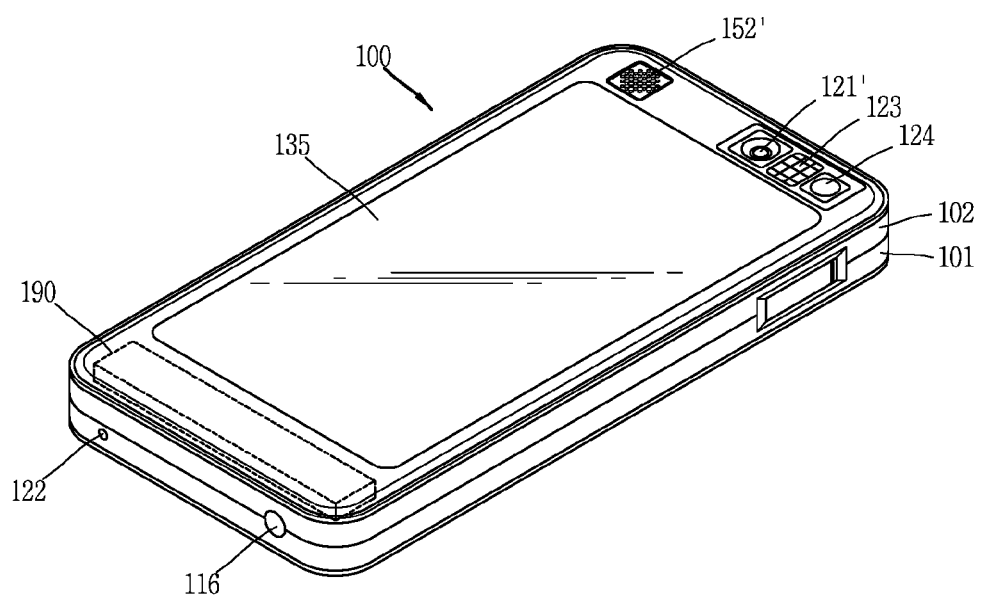

FIG. 2A is a front perspective view illustrating an example of a mobile terminal according to an embodiment of the present disclosure or an example of a mobile terminal, and FIG. 2B is a rear perspective view illustrating the mobile terminal in FIG. 2A.

The mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

According to the drawing, the terminal body 100 (hereinafter, referred to as a "body") may include a front surface, a lateral surface, and a rear surface. Furthermore, the body may include both ends thereof formed along the length direction.

The body 100 includes a case (casing, housing, cover, etc.) forming an appearance of the terminal. In this embodiment, the case may be divided into a front surface (hereinafter, referred to as a "front case") 101 and a rear surface (hereinafter, referred to as a "rear case") 102. Various electronic components may be incorporated into a space formed between the front case 101 and rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (130/131, 132), a microphone 122, an interface 170, and the like may be arranged on the terminal body 100, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102. On the contrary, the microphone 122 may be disposed at the other end of the body 100.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may receive a command, such as start, end, scroll, or the like, and the second manipulation unit 132 may receive a command, such as controlling a volume level being outputted from the audio output unit 152, or switching it into a touch recognition mode of the display unit 151.

Furthermore, an audio output unit 152' may be additionally disposed on a rear surface of the terminal body. The audio output unit 152' together with the audio output unit 152 (refer to FIG. 2A) can implement a stereo function, and it may be also used to implement a speaker phone mode during a phone call.

Furthermore, a power supply unit 190 for supplying power to the mobile terminal 100 may be mounted on a rear surface of the terminal body. The power supply unit 190 may be configured so as to be incorporated in the terminal body, or directly detachable from the outside of the terminal body.

Furthermore, a touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

Furthermore, a camera 121' may be additionally mounted on the rear case 102 of the terminal body. The camera 121' has an image capturing direction, which is substantially opposite to the direction of the camera 121 (refer to FIG. 2A), and may have different pixels from those of the first video input unit 121.

For example, that the camera 121 may preferably have a relatively small number of pixels enough not to cause a difficulty when the user captures his or her own face and sends it to the other party during a video call or the like, and the camera 121' has a relatively large number of pixels since the user often captures a general object that is not sent immediately. The cameras 121' may be provided in the terminal body 100 in a rotatable and popupable manner.

Furthermore, a flash 123 and a mirror 124 may be additionally disposed adjacent to the camera 121'. The flash 123 illuminates light toward an object when capturing the object with the camera 121'. The mirror allows the user to look at his or her own face, or the like, in a reflected way when capturing himself or herself (in a self-portrait mode) by using the camera 121'.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

Furthermore, the controller 180 including at least one of the foregoing constituent elements in a mobile terminal according to an embodiment of the present disclosure may display a lock screen in a lock state in which a control command input to an application is restricted. Furthermore, the controller 180 may display at least one object on the lock screen when a touch input sensed on the lock screen corresponds to the set criteria.

Furthermore, the controller 180 releases the lock state based on the touch input and a sequentially entered touch input, namely, switches the state of the terminal from a lock state into an unlock state, and displays an execution screen corresponding to any one of objects displayed on the lock screen. In other words, the controller 180 can release the lock state to activate an application corresponding to an object displayed on the lock screen based on the sequentially entered touch input.

Here, the lock state refers to a state in which a user's control command input to applications included in the mobile terminal is restricted. In a mobile terminal mostly provided with a touch screen (or display unit 151 having a touch screen), it may be provided to prevent the functions and applications of the mobile terminal from being activated or deactivated by a control command unintended by the user. Accordingly, in the lock state, a user's control command input entered over the touch screen 151 and other user input units 130 can be restricted within a prescribed range.

On the other hand, a user's control command input is restricted in the lock state, but the operations of the functions and applications of the mobile terminal that have been operated prior to implementing the lock state can be continuously carried out.

Furthermore, the unlock state is a state in which a user's control command input to the mobile terminal is not restricted. Accordingly, in the unlock state, the functions and applications of the mobile terminal may be activated or deactivated according to a control command entered by the user.

Here, the lock state can be implemented when a user's input to the touch screen 151 and other user input units 130 provided in the mobile terminal has not been sensed for a prescribed period of time. The prescribed period of time may be changed by the user's setting.

Furthermore, the lock state may be implemented when a specific key (for example, hold key) provided in the mobile terminal that has been previously set for the lock state is pressed by the user.

In this disclosure, a case where a user's input to the mobile terminal has not been sensed for a prescribed period of time, or an input to the specific key has been sensed to implement a lock state, may be expressed as "implementing a lock state when a prescribed condition is satisfied."

Furthermore, the unlock state may be implemented by allowing the user to press the specific key again or by a touch input to be sensed on a lock screen being displayed in the lock state.

Next, an "object" displayed on the lock screen as described above, refers to a target on which the user's intention or behavior exerts its effect, for example, an icon of the application installed in the mobile terminal, an execution screen image of the application, or the like.

Furthermore, the object may include various kinds of information such as information on an application being activated in the lock state, information on a newly generated event, or the like.

Accordingly, as described above, the meaning of "displaying an execution screen corresponding to any one of objects" may refer to "activating an application corresponding to an icon of the application, and displaying a screen of the activated application."

As described above, the controller 180 may activate an application while at the same time releasing a lock state based on a touch input satisfying the set criteria sensed on a lock screen, thereby reducing the user's inconvenience of releasing the lock state and then selecting the application again.

Hereinafter, referring to FIGS. 3, 4A and 4B, a control method for directly entering an application in a lock state in a mobile terminal associated with the present disclosure will be described as an example.

Figure 3:
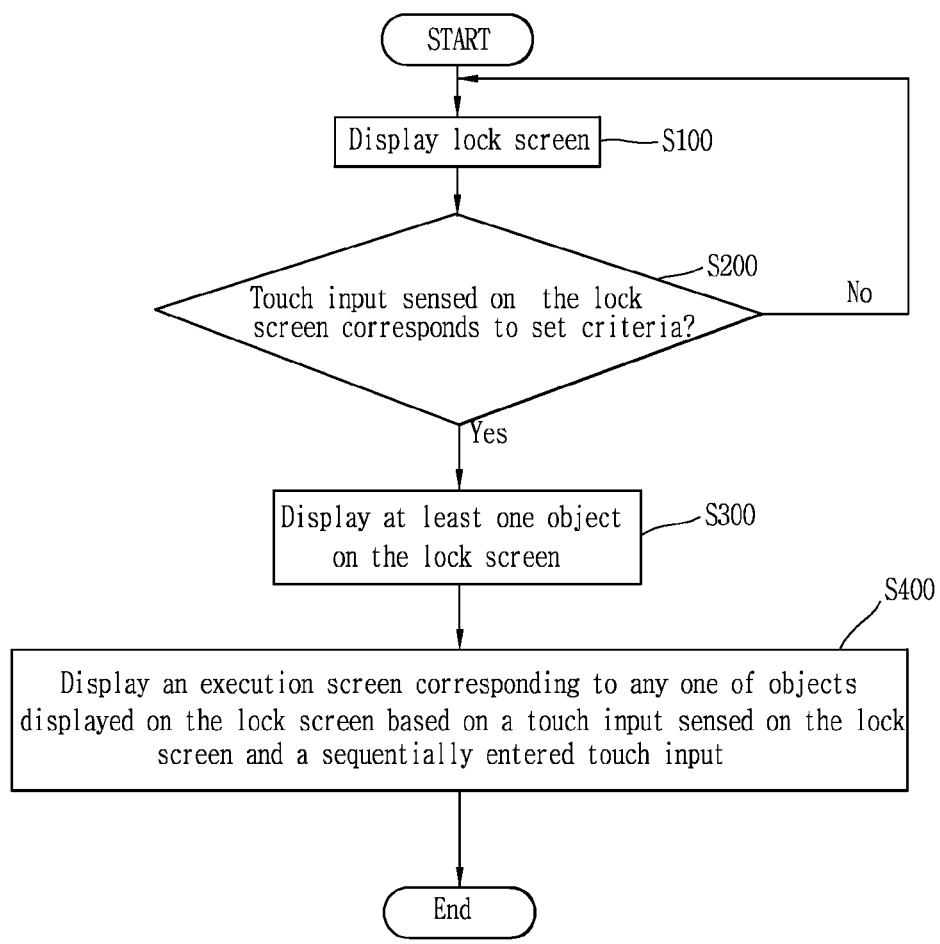
FIG. 3 is a flow chart illustrating a method of controlling a mobile terminal according to an embodiment disclosed in the present disclosure.
Figure 4A:
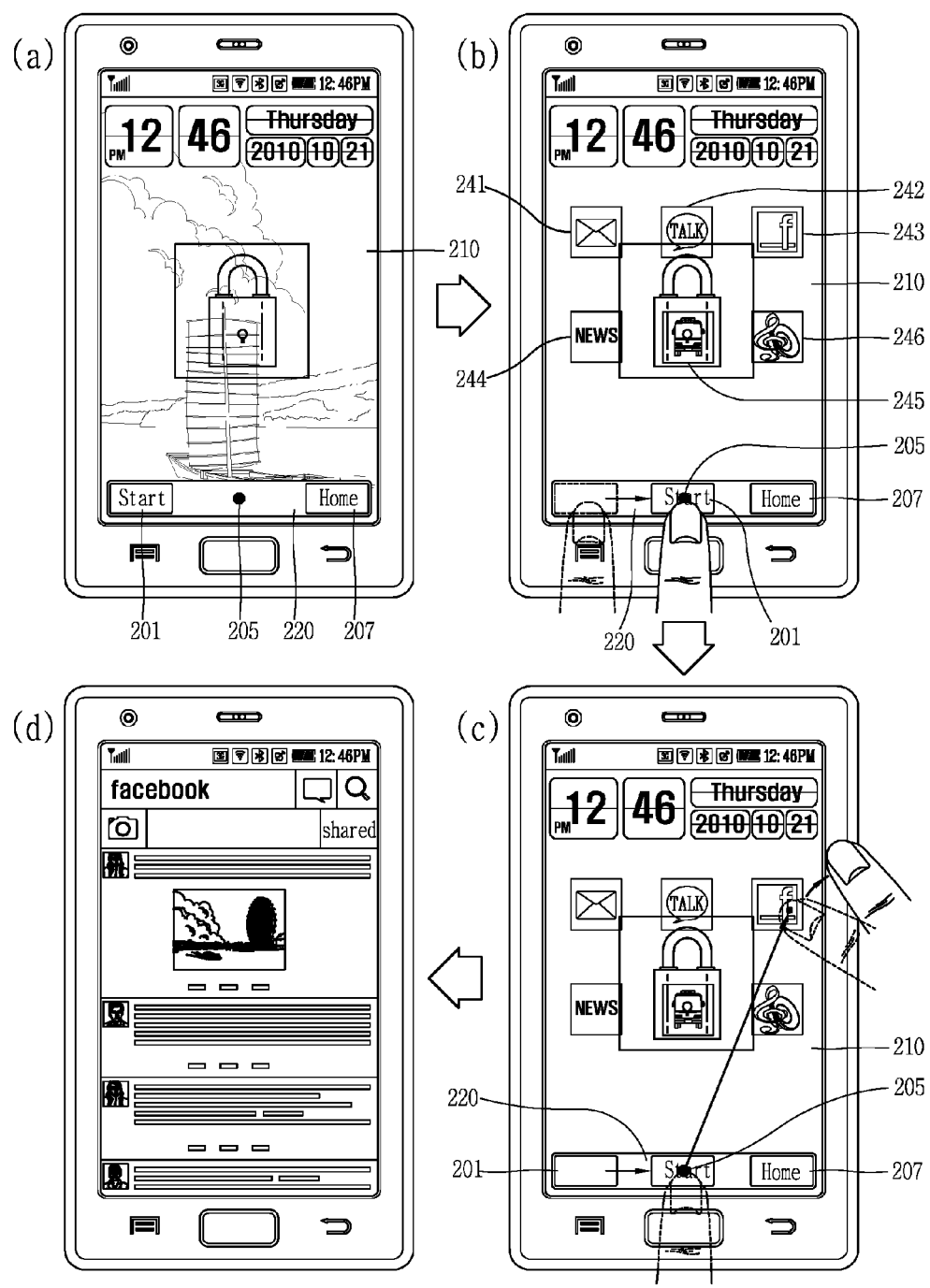
FIGS. 4A and 4B are conceptual views illustrating a method of controlling a mobile terminal according to an embodiment disclosed in the present disclosure.
Figure 4B:
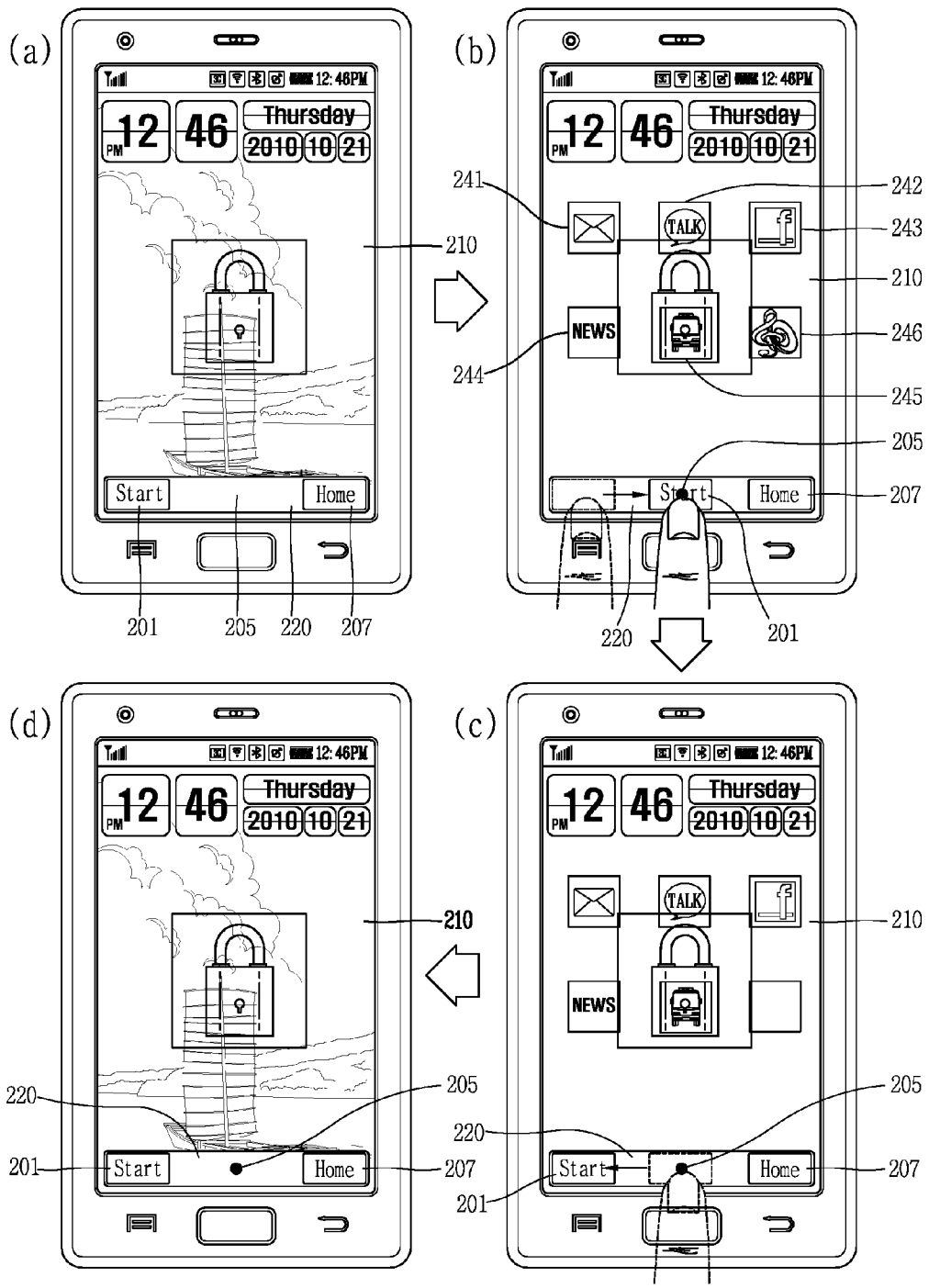

FIG. 3 is a flow chart illustrating a method of controlling a mobile terminal according to an embodiment disclosed in the present disclosure, and FIGS. 4A and 4B are conceptual views illustrating a method of controlling a mobile terminal according to an embodiment disclosed in the present disclosure.

First, a control method according to an embodiment of the present disclosure displays a lock screen on the display unit 151 when a screen of the display unit 151 is turned on in a lock state, namely, when the illumination of the display unit 151 is activated (S100).

Here, the lock screen displayed on the display unit 151 may include a background image consisted of an image, video, text, or the like selected by the controller 180 or the user's setting.

Furthermore, the lock screen may include an "unlock region" for receiving an input for releasing the lock state, and the controller 180 may release the lock state using a touch input sensed on the "unlock region."

Furthermore, the size and shape of the "unlock region" may be configured in various ways by the controller 180 of the user's setting.

For example, a lock screen 210 displayed in a lock state is illustrated in FIG. 4Aa, and the lock screen 210 may include an unlock region 220 for receiving a touch to release a lock state.

Furthermore, the kinds of touches for releasing a lock state, which are received into the unlock region 220, may be configured in various ways. For example, the lock state may be switched into an unlock state by a dragging, sliding, or flicking touch input, starting from a "start" position 201 and ending with a "home" position 207.

On the other hand, the controller 180 determines whether a touch input sensed on the lock screen 210 corresponds to the set criteria (refer to FIG. 3) (S200).

Here, a "touch input corresponding to the set criteria" may refer to a case where a touch (it may be also expressed as a "first touch input") from a preset start position of the unlock region 220 included in the lock screen 210 to a preset one position is entered.

In other words, when a touch starting from a start position on a preset path for releasing a lock state of the mobile terminal to a preset one position on the path is sensed, it may correspond to the set criteria. A touch input satisfying the set criteria may be also expressed as a "first touch input" for the sake of convenience.

On the other hand, in the above, the unlock region 220 has been expressed as a "path" to which a touch input is sequentially entered, but the unlock region 220 may not be necessary to be a path to which a sequential touch is entered. For example, the unlock region 220 may be a position to which a touch is entered for a prescribed period of time, or a position to which a plurality of touches are sequentially entered.

On the other hand, in step S200, when a touch applied on the lock screen 210, namely, the unlock region 220 included in the lock screen 210, corresponds to the set criteria, the controller 180 displays at least one object on the lock screen 210 (S300), and successively displays the lock screen 210 when the touch input does not correspond to the set criteria.

For example, as illustrated in FIG. 4Ab, if a first touch input starting from the start position to a preset first position 205 is sensed, then the controller 180 may display at least one object on the lock screen 210.

On the other hand, when the object is displayed on the lock screen 210, a screen image that has been displayed on the lock screen 210 prior to displaying the object can be disappeared, or overlapped to be successively displayed.

Furthermore, a plurality of objects may be displayed on the lock screen 210, wherein the object displayed thereon may be an icon or execution screen image corresponding to the application.

Furthermore, a displayable object on the lock screen 210 may be detected by the detection unit 181. In other words, the detection unit 181 can detect at least one of an application in which an event has occurred during the lock state, an application that has been executed prior to entering the lock state, a preset application to be displayed on the lock state, and an application being executed in the lock state. If an object is detected by the detection unit 181, then the controller 180 displays an icon or execution screen image of the detected application on the lock screen 210.

Furthermore, the controller 180 may first display an icon or image corresponding to an application having a higher priority based on priority information set by the user or the like, among applications detected by the detection unit 181.

For example, when an "application in which an event is newly generated" is set to be preferentially displayed than other applications, the controller 180 may display an object corresponding to the "application in which an event is newly generated," among applications detected by the detection unit 181.

Furthermore, the number, sequence, kind and the like of objects may be changed by the user's setting or the controller 180.

Next, if a first touch input and a sequentially entered second touch input are applied to display the object on the unlock region 220, then the controller 180 releases the lock state based on the successive first and second touch inputs, and displays an execution screen corresponding to any one of objects displayed on the lock screen (refer to FIG. 3) (S400).

Here, an execution screen displayed in step S400 as a screen having an activated application may be a screen indicating a progress state just prior to releasing the lock state or up to just prior to entering the lock state, namely, the last progress state, or an initial screen of the application.

Furthermore, here, an execution screen displayed on the display unit 151 based on the first touch input and a sequentially entered second touch input to satisfy a touch for releasing a lock state through the successively entered touch inputs, may be the execution screen of an application corresponding to an object located at a position to which a touch input satisfying the unlock condition of the lock state is applied.

Furthermore, here, a "touch for releasing the lock state" as a touch input satisfying an unlock condition of the lock state, may typically be a drag touch input sequentially entered from a start position 201 to a home position 207 on the unlock region 220.

However, according to the present disclosure, there may exist a plurality of kinds of touch inputs and paths satisfying the unlock condition, and all the plurality of paths may be included in the lock screen.

For example, if a first touch input entered at the first position 205 and a sequentially entered second touch input are applied to any one of a first through a sixth object (241 to 246) displayed on the lock screen 210 as illustrated in FIG. 4Ac, the lock state is released.

Furthermore, the controller 180 displays the execution screen of an application corresponding to the any one when the lock state is released.

In other words, here, a "touch for releasing the lock state", namely, an unlock condition of the lock state, may be a touch input, which is started from the start position 201, and passed through the first position 205 (it may be expressed as a "first touch input"), and then sequentially started from the first position 205 to any one of objects displayed on the lock screen 210 (it may be expressed as a "second touch input").

In this case, the controller 180 may determine an object located at a position from which the touch input is released or at a position at which the touch input is maintained for a prescribed period of time, and implement an application corresponding to the determined object.

Accordingly, if a touch sequentially dragged from the first position 205 to the third object 243 is entered, and the touch is released at the position or continuously maintained for a prescribed period of time, then an execution screen 310 corresponding to the third object 243 is displayed, and the lock state is released as illustrated in FIG. 4Ad.

In other words, the lock state may be released by using an object displayed on the lock screen 210 in addition to a touch input entered to the home position 207 of the unlock region 220 on the lock screen 210.

Accordingly, even if there exists one start position at which a touch input for releasing the lock state is started, there may exist a plurality of unlock positions for releasing the lock state, and therefore, there may also exist a plurality of touch input paths for releasing the lock state.

Furthermore, as illustrated in FIG. 4A, the plurality of unlock positions may be located at positions displayed with the objects (241 to 246), respectively, displayed on the lock screen 210. Accordingly, the controller 180 may implement an application corresponding to an object which corresponds to a position at which the touch input is released, among a plurality of unlock positions of the touch input for releasing the lock state.

In other words, if the user performs a touch input starting from the start position 201 to the first position 205 on the unlock region 220, and then sequentially performs a touch input from the first position 205 to a position displayed with an object corresponding to the application desired to be implemented, and then releases the touch input at the position or maintains the touch for a prescribed period of time, then the application desired to be implemented may be carried out.

In other words, a region displayed with an object on the lock screen 210 may be an unlock position for releasing the lock state, and a touch against the region displayed with the object may be a position for generating an unlock command to release the lock state.

Furthermore, when a touch input is sequentially entered from a first position of the unlock region 220 to an unlock position included in a path of the unlock region 220, the user may enter home screen without entering an execution screen of the application.

Furthermore, as illustrated in FIG. 4B, when a touch input to the first position 205 on the unlock region 220 is sensed to display objects (241 to 246) on the lock screen 210, and then a sequential touch input is not entered at the unlock position, the objects (241 to 246) displayed on the lock screen 210 may be disappeared.

As described above, a mobile terminal and control method thereof according to an embodiment of the present disclosure may directly enter an application using a touch input for releasing the lock state. In other words, the user can release the lock state on the basis of a touch corresponding to the prescribed path, and activate an application related to an object (or icon) displayed on the lock screen.

In the above, a case where a position displayed with an object is an unlock position for releasing the lock state has been described.

Hereinafter, the method of releasing a lock state using a plurality of prescribed paths, and implementing a preset application based on a touch input corresponding to each path will be described.

Figure 5A:
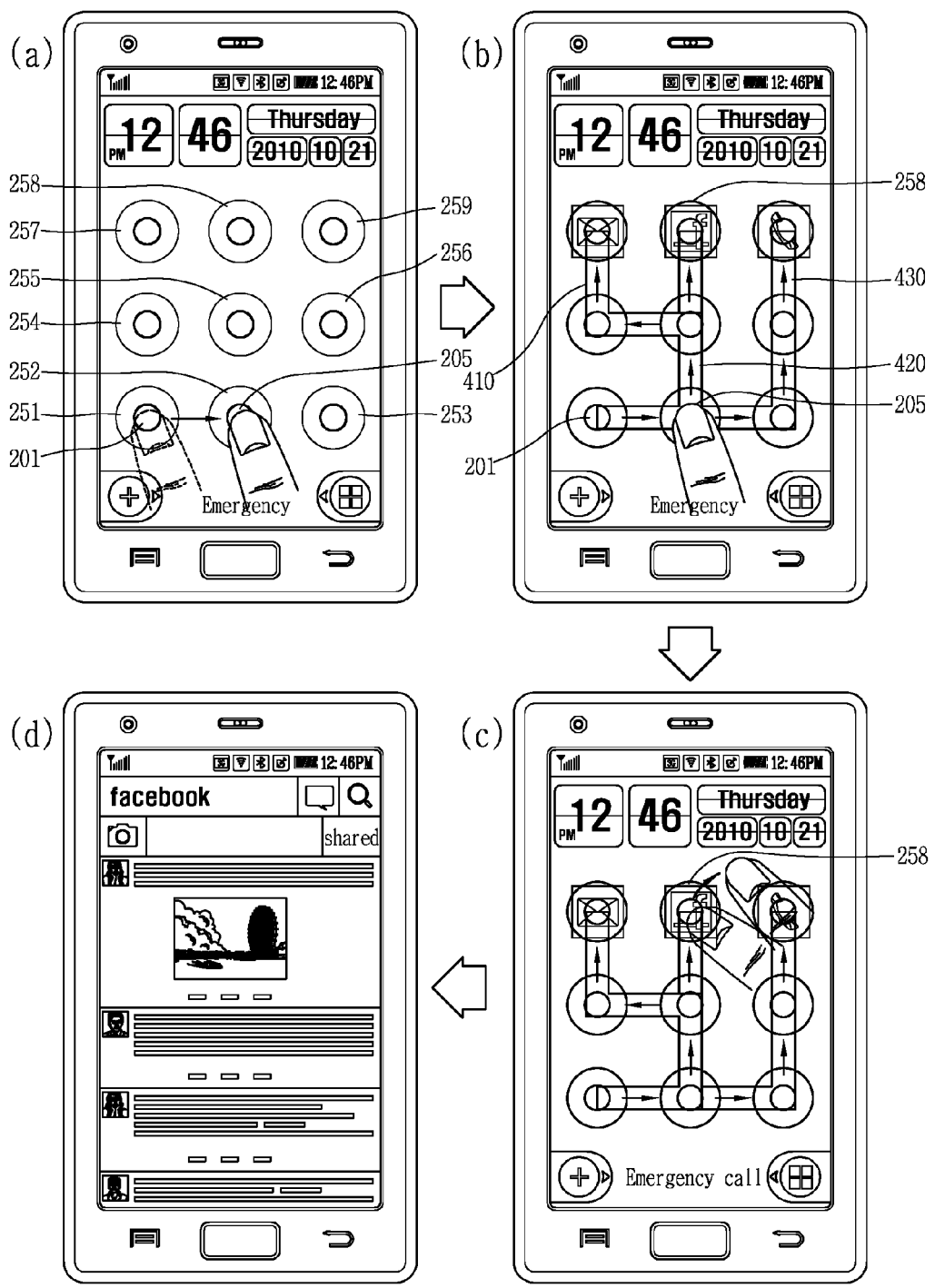
FIGS. 5A, 5B and 5C are conceptual views illustrating a method of releasing a lock state in a mobile terminal according to an embodiment disclosed in the present disclosure.
Figure 5B:
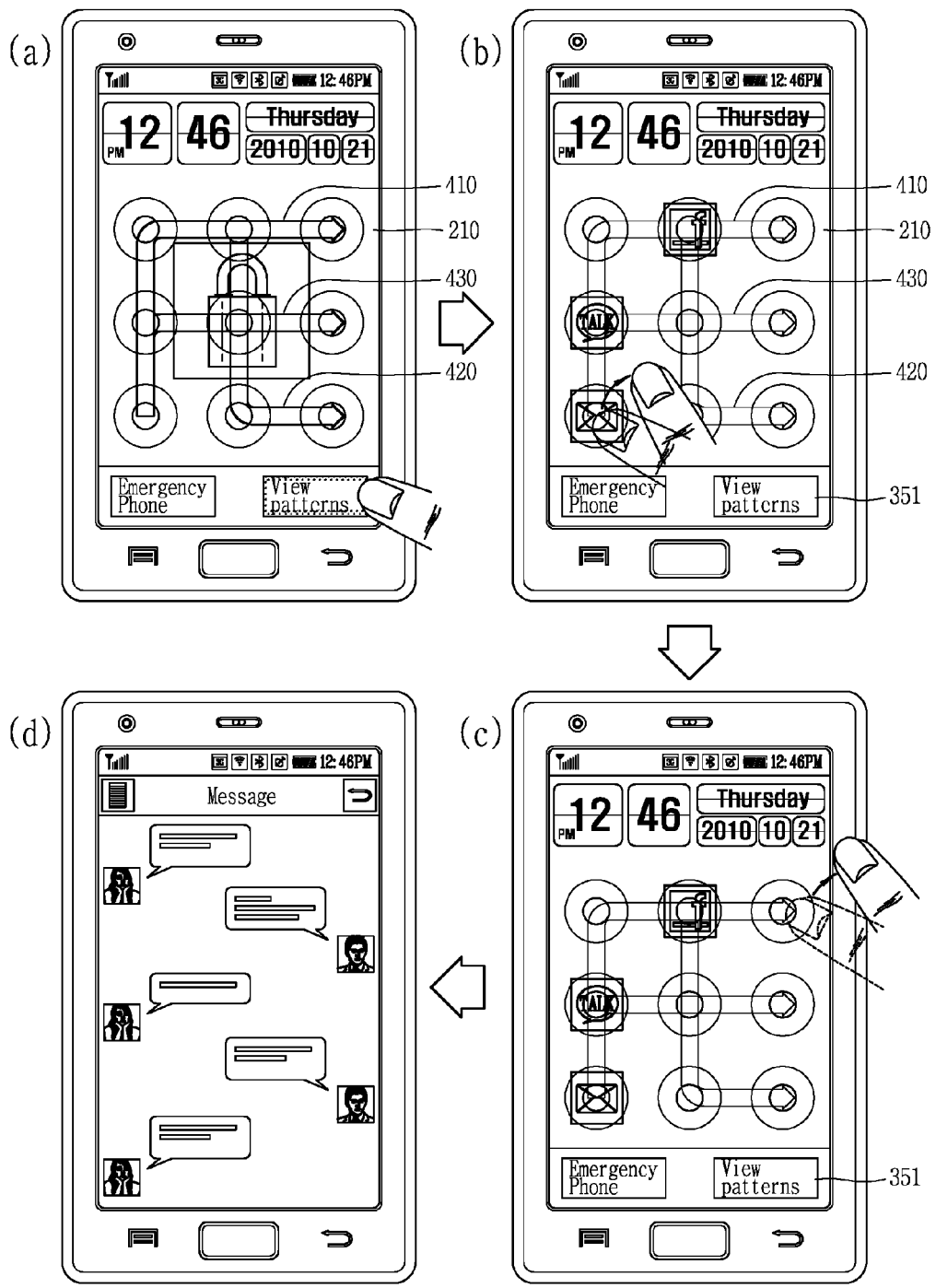
Figure 5C:
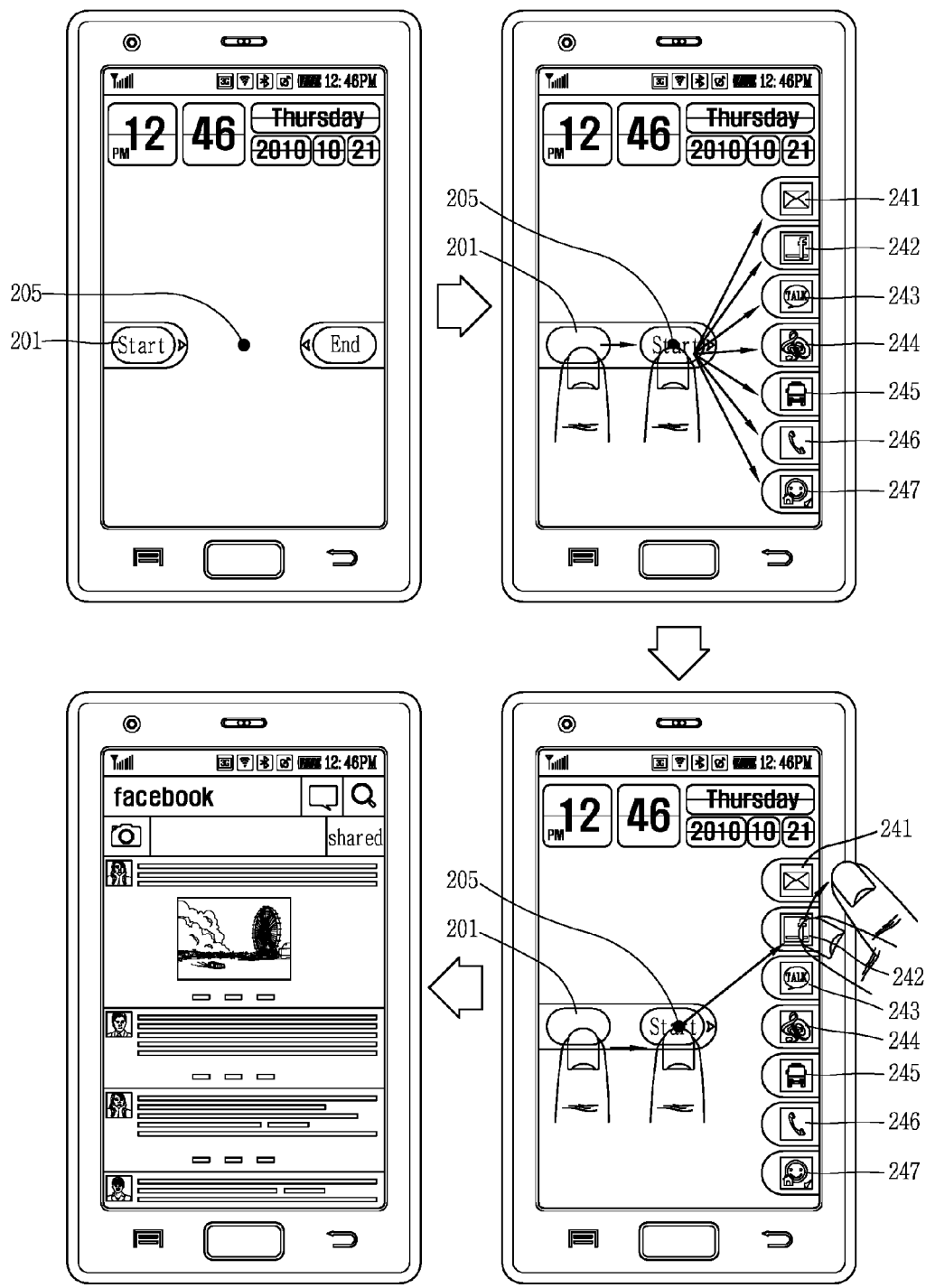

FIGS. 5A, 5B and 5C are conceptual views illustrating a method of releasing a lock state in a mobile terminal according to an embodiment disclosed in the present disclosure.

First, a mobile terminal and control method thereof according to an embodiment of the present disclosure may enter a touch corresponding to a preset pattern for releasing a lock state.

For example, as illustrated in FIG. 5A, when a touch input starting from any one preset position of a first through a ninth position (251 to 259) displayed on the lock screen 210 to at least another position corresponding to a preset pattern is implemented with a brush drawing, the lock state may be released.

For example, if a touch against a pattern starting from the left of the first column and ending with the most right thereof on a lock screen consisted of the first through ninth positions (251 to 259) is entered, then the lock state is released. In other words, when a touch starting from the first position 251, passing through the second position 252, and ending with the third position 253 is entered, then the controller 180 releases the lock state.

In general, when a preset pattern, namely, a touch corresponding to a preset path is entered in a lock state as described above, the lock state may be switched into an unlock state. However, a mobile terminal and control method according to an embodiment of the present disclosure may be set to activate an application while at the same time releasing the lock state using a pattern for releasing the lock state.

A mobile terminal according to an embodiment of the present disclosure may set a plurality of patterns to release the lock state. As an example, a touch input corresponding to the plurality of patterns may be entered by using a plurality of touch positions (251 to 259) as described above 5Aa.

Furthermore, any one of the plurality of patterns may be a pattern for entering home screen as in a typical release of the lock state, which is not the process of entering a specific application (the description of a pattern input for entering a typical home screen will be omitted in FIG. 5A).

First, according to an embodiment of the present disclosure, the controller 180 may set a "start position" for a touch input corresponding to any one of a plurality of patterns in the same manner, or in a different manner for each pattern. The shape, configuration or the like for a start position and unlock position of the pattern may be changed in various ways by the setting of the user and controller 180.

First, as illustrated in FIG. 5Aa, if a touch, namely, a first touch, from a preset start position 201 to a preset position for generating a command to display an object, is entered (in FIG. 5A, the preset position is set to a position corresponding to the reference numeral "252" as illustrated in the drawing), then the controller 180 displays a plurality of objects 241, 242, 243 on the lock screen 210 as illustrated in FIG. 5Ab.

Furthermore, the controller 180 may display a plurality of patterns 410, 420, 430 corresponding to the each object together with the plurality of objects on the lock screen 210.

Here, the objects may be displayed in various ways at a start position, an end position, a middle position or the like of the pattern, and may be displayed at a start or end position of the pattern, thereby providing information indicating a start or end of the pattern to the user.

Next, as illustrated in FIG. 5Ab, if a first touch entered up to the preset position 252 and a sequential second touch are entered to correspond to any one of the plurality of patterns 410, 420, 430, then an execution screen corresponding to an object which corresponds to the pattern of the second touch is displayed.

For example, if a second touch is entered along the second pattern 420 as illustrated in FIG. 5Ab among the plurality of patterns 410, 420, 430, then an execution screen of the application related to the second object 242 corresponding to the plurality of patterns is displayed as illustrated in FIG. 5Ad, and the lock state is released.

Next, referring to FIG. 5B, a mobile terminal and control method thereof according to an embodiment of the present disclosure may display a plurality of prescribed patterns through an icon 351 on the lock screen 210, and the user may obtain information for releasing the lock state through the displayed patterns.

Furthermore, if a touch (first touch) is entered up to a preset position for any one of the displayed plurality of patterns 410, 420, 430, then the controller 180 displays an object on the lock screen 210.

Here, the controller 180 may display only an object corresponding to a pattern for which the first touch is sensed on the lock screen 210, and a plurality of all objects set to the plurality of patterns, respectively, may be displayed thereon.

Furthermore, if the first touch input and a sequential second touch input are applied to any one of the plurality of patterns as illustrated in FIG. 5Bb, then an execution screen of the application corresponding to the pattern may be displayed as illustrated in FIG. 5Bd.

As illustrated in FIGS. 5A and 5B together, a mobile terminal and control method according to an embodiment of the present disclosure may release a lock state while at the same time displaying an execution screen of the application related an object corresponding to each pattern using different patterns for releasing the lock state.

Accordingly, the user may activate an application while releasing the lock state using a pattern.

Next, referring to 5C, the method of releasing the lock state and activating an application using a different method from a pattern illustrated in FIGS. 5A and 5B as described above, is illustrated in FIG. 5C.

The controller 180 according to an embodiment of the present disclosure displays objects in a region of the lock screen when a touch is sensed from the start position 201 receiving a touch input for releasing the lock state to a preset first position 205 as illustrated in FIG. 5C. Next, if a sequential touch is sensed at the first position 205 for any one of the displayed objects, then the controller 180 displays an execution screen of the application corresponding to any one object, and releases the lock state.

Accordingly, as illustrated in FIG. 5C, the controller 180 releases the lock state based on a sequential touch input to the second object 242, and activates "Facebook" which is an application corresponding to the second object 242, and then displays an execution screen of "Facebook" on the display unit 151.

Furthermore, a mobile terminal and control method according to an embodiment of the present disclosure may release a lock state using various types of patterns and unlock regions other than the foregoing patterns disclosed in FIGS. 5A through 5C as described above.

In the above, the method of releasing a lock state and activating an application corresponding to the pattern using a plurality of patterns has been described.

Hereinafter, various modified examples of the method for releasing a lock state as described above will be described.

Figure 6A:
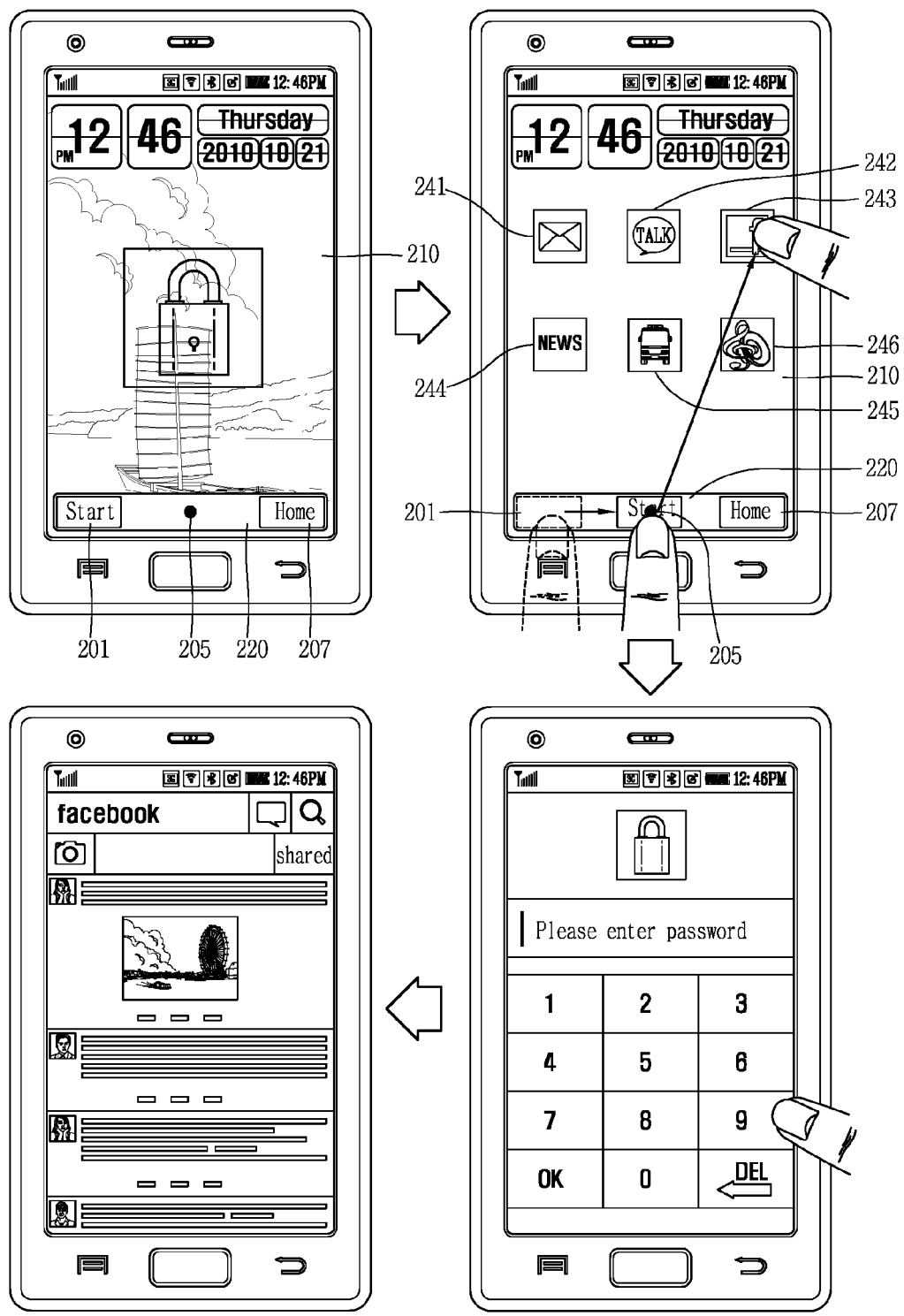
FIGS. 6A, 6B and 6C are conceptual views illustrating a method of displaying supplementary information in a mobile terminal according to an embodiment disclosed in the present disclosure.
Figure 6B:
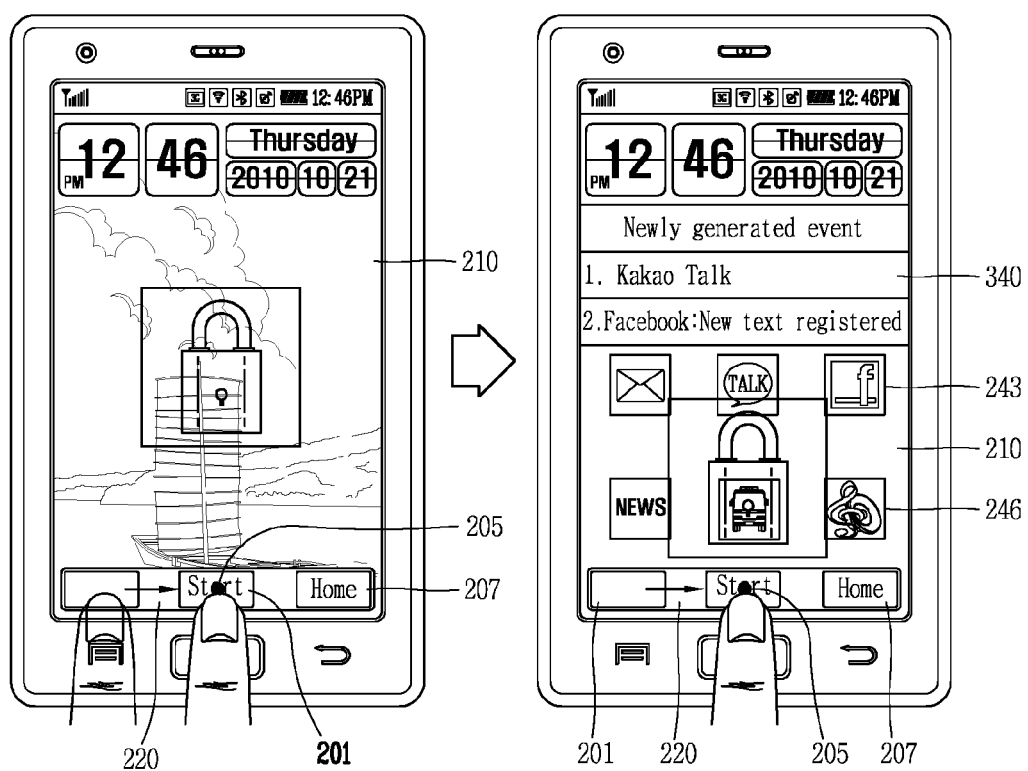
Figure 6C:
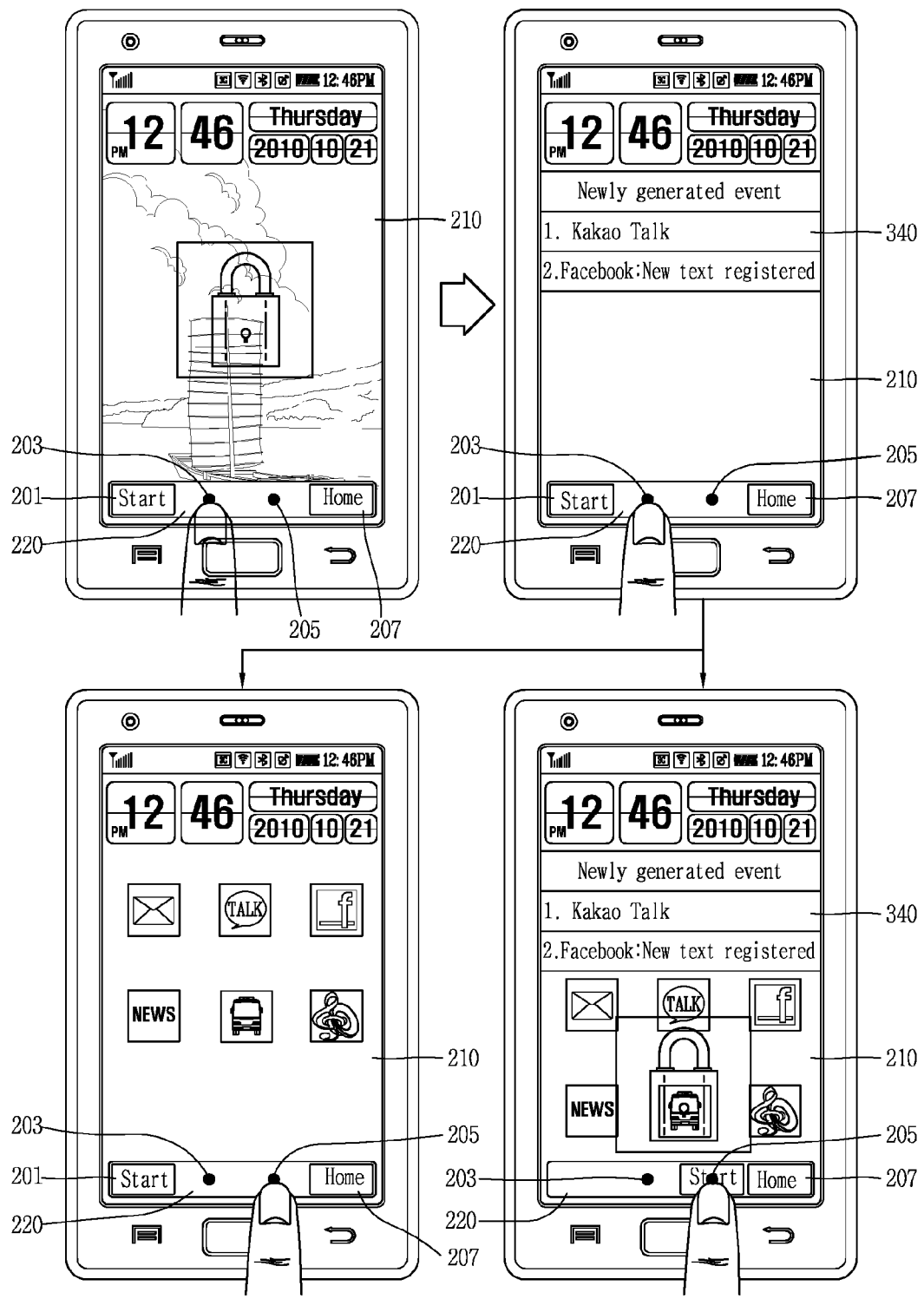

FIGS. 6A, 6B and 6C are conceptual views illustrating a method of displaying supplementary information in a mobile terminal according to an embodiment disclosed in the present disclosure.

First, as illustrated in FIG. 6A, it is assumed that the user activates an object "Facebook," which is a third object, using sequential first and second touch inputs, starting from the start position 201, passing through the first position 205, and leading to the third object 243, and releases a lock state.

When an application corresponding to an arbitrary object is carried out based on the first and the second touch input, the controller 180 may add a condition for implementing or activating the application based on the kind, setting or the like of the application.

In other words, the controller 180 may set an "activation condition" to an application selected by the user or an application satisfying a preset condition to activate the application only when an input satisfying the "activation" condition is received from the user.

Here, the application satisfying a preset condition may be an application related to personal life, such as banking, diary, memo, message, and the like.

Accordingly, the controller 180 displays a window for receiving "password" when there is a sequential touch against the third object 243 as illustrated in FIG. 6A, and activates an application corresponding to the third object 243 only when a password is received from the user.

Furthermore, here, the set "activation condition" may be a touch input having a preset numerals (password), prescribed pattern, or the like (for example, a touch input having a star-shaped pattern). Furthermore, the "activation condition" may be set by means of various methods such as fingerprint recognition, voice recognition, face recognition, or the like.

Next, referring to FIG. 6B, if a touch input starting from the start position 201 for releasing the lock state and ending with a preset first position 205 for displaying an object the controller 180 is sensed, then information on events occurred in the mobile terminal may be displayed on a separate display window 340.

The display window 340 may be displayed in a separate manner from the objects, and may be also displayed to be overlapped with the object, and if a touch input sequentially entered from the first position 205 is led to a selection for any one of information displayed on the display window 340, then the controller 180 may activate an application corresponding to the selected information.

Furthermore, a message newly arrived at the mobile terminal, a new text notification message of the SNS site, a warning against schedules or a status warning of the mobile terminal (for example, battery low warning) and the like may be displayed on the display window 340.

Furthermore, there may be provided a first and a second position 203, 205 which are separated from each other as illustrated in FIG. 6C, and if a touch starting from the start position 201 to the first position 203 is entered, then the controller 180 may display the display window 340 on the lock screen 210, and then if a sequential touch starting from the touch and leading to the second position 205 is entered, then a plurality of objects may be displayed on the lock screen 210.

Furthermore, as illustrated in FIG. 6C, if a sequential touch starting from the first position 203 is entered up to the second position 205, then the controller 180 may display a plurality of objects together with the display window 340 that has been previously displayed.

As described above, a mobile terminal and control method according to an embodiment of the present disclosure can display effective information for the user on the lock screen 210.

Next, the method of directly entering the user's desired home screen in a lock state will be described.

Figure 7:
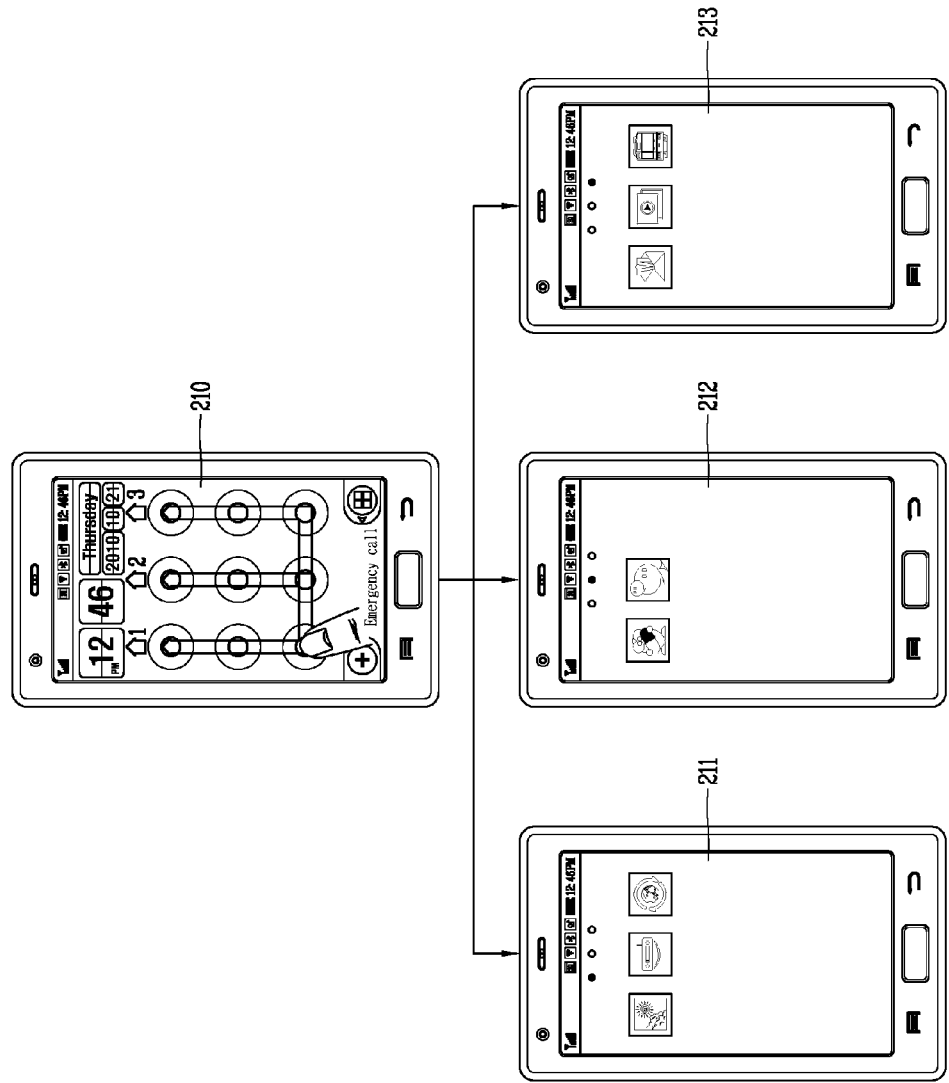
FIG. 7 is a conceptual view illustrating a method of entering home screen in a mobile terminal according to an embodiment disclosed in the present disclosure.

FIG. 7 is a conceptual view illustrating a method of entering home screen in a mobile terminal according to an embodiment disclosed in the present disclosure.

As described above, the method of directly entering a user's desired application in a lock state has been described. However, a mobile terminal and control method thereof according to an embodiment of the present disclosure may directly enter a user's desired home screen as well as directly entering an application in a lock state.

For example, as illustrated in FIG. 7, if a touch is entered from the start position 201 started with a touch input for releasing a lock state to a prescribed first position to display objects, then the controller may display at least one or more objects corresponding to home screen.

Here, "home screen" as an idle screen displayed in an unlock state in which the lock state is released, may refer to a screen on which the icons of applications installed in the mobile terminal are displayed. Furthermore, a plurality of the home screens may exist according to the user's setting.

On the other hand, as illustrated in FIG. 7, if an object corresponding to home screen is displayed on the lock screen 210, then the user successively apply a touch to a pattern corresponding to any one of the displayed objects. When a pattern entered by the user corresponds to a prescribed pattern, then the controller 180 releases the lock state and displays home screen related to an object corresponding to the pattern to which the touch is applied.

Accordingly, as illustrated in FIG. 7, if the lock state is released, then any one of a first through a third home screens 211, 212, 213 may be displayed on the display unit based on the user's selection.

In this manner, a mobile terminal and control method according to an embodiment of the present disclosure may directly enter a user's desired screen through a touch input to an object displayed on the lock screen.

Next, the method of sequentially displaying the information of an application having a newly generated event will be described.

Figure 8:
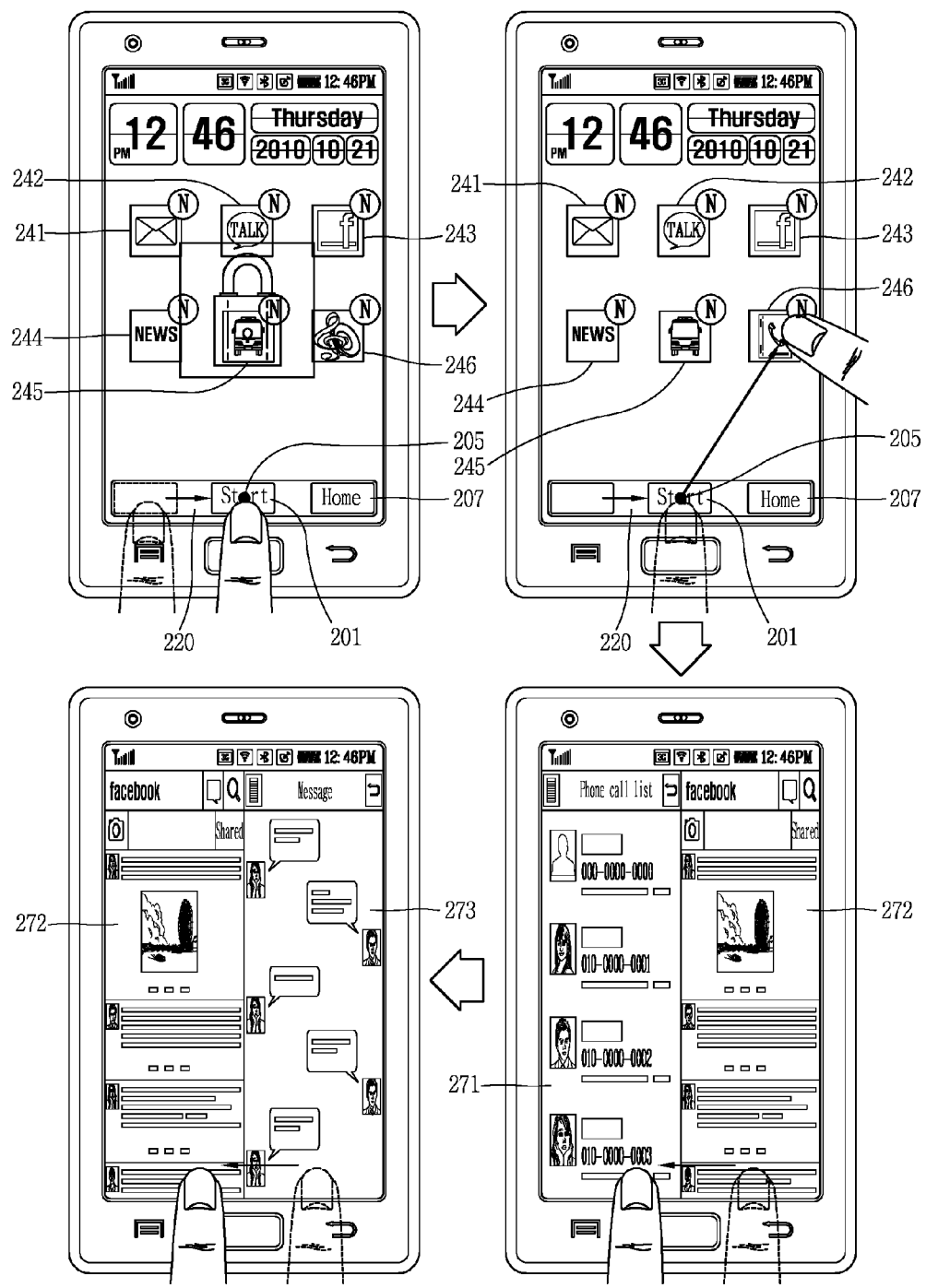
FIG. 8 is a conceptual view illustrating a method of displaying newly generated information in a mobile terminal according to an embodiment disclosed in the present disclosure.

FIG. 8 is a conceptual view illustrating a method of displaying newly generated information in a mobile terminal according to an embodiment disclosed in the present disclosure.

First, if a touch is entered from the start position 201 at which a touch input for releasing a lock state is started to a prescribed first position to display object, then the controller 180 displays a plurality of objects on the lock screen 210.

The controller 180 may preferentially display an application having a newly generated event among applications displayable on the lock screen 210 that have been detected from the detection unit 181 (refer to FIG. 1).

Accordingly, objects corresponding to event-generated applications are displayed on the lock screen 210. Next, if a touch input up to the first position and a sequential touch against any one of objects displayed on the lock screen 210 are entered, then the controller 180 displays an execution screen of the application corresponding to an object to which the touch is entered.

In this case, the controller 180 configures the execution screen of the application to display newly generated event information.

For example, if the sixth object 246 is selected by the user, then the controller 180 releases the lock state, and displays a phone call list execution screen 271 including missed calls. Furthermore, subsequent to the phone call list execution screen 271, the controller 180 may successively display event information related another application to display newly generated event information for the user.

Accordingly, if a preset touch input, for example, a touch input such as sliding, dragging, flicking, or the like, is first sensed on the phone call list execution screen 271, then the controller 180 may display another application, for example, a "Facebook" execution screen 272. The "Facebook" execution screen 272 is a screen on which information corresponding to a newly generated event on "Facebook" is displayed.

Furthermore, if a preset touch input to the "Facebook" execution screen 272 is sensed, then the controller 180 displays an execution screen corresponding to another application in which an event has occurred. Accordingly, a text message execution screen 273 may be displayed subsequent to the "Facebook" execution screen 272.

As described above, the controller 180 can successively display information on an application in which an event has occurred while at the same time releasing the lock state, thereby allowing the user to check information on an event occurred in the mobile terminal at once.

Next, the method of setting an application corresponding to a plurality of patterns will be described with reference to FIG. 9.

Figure 9:
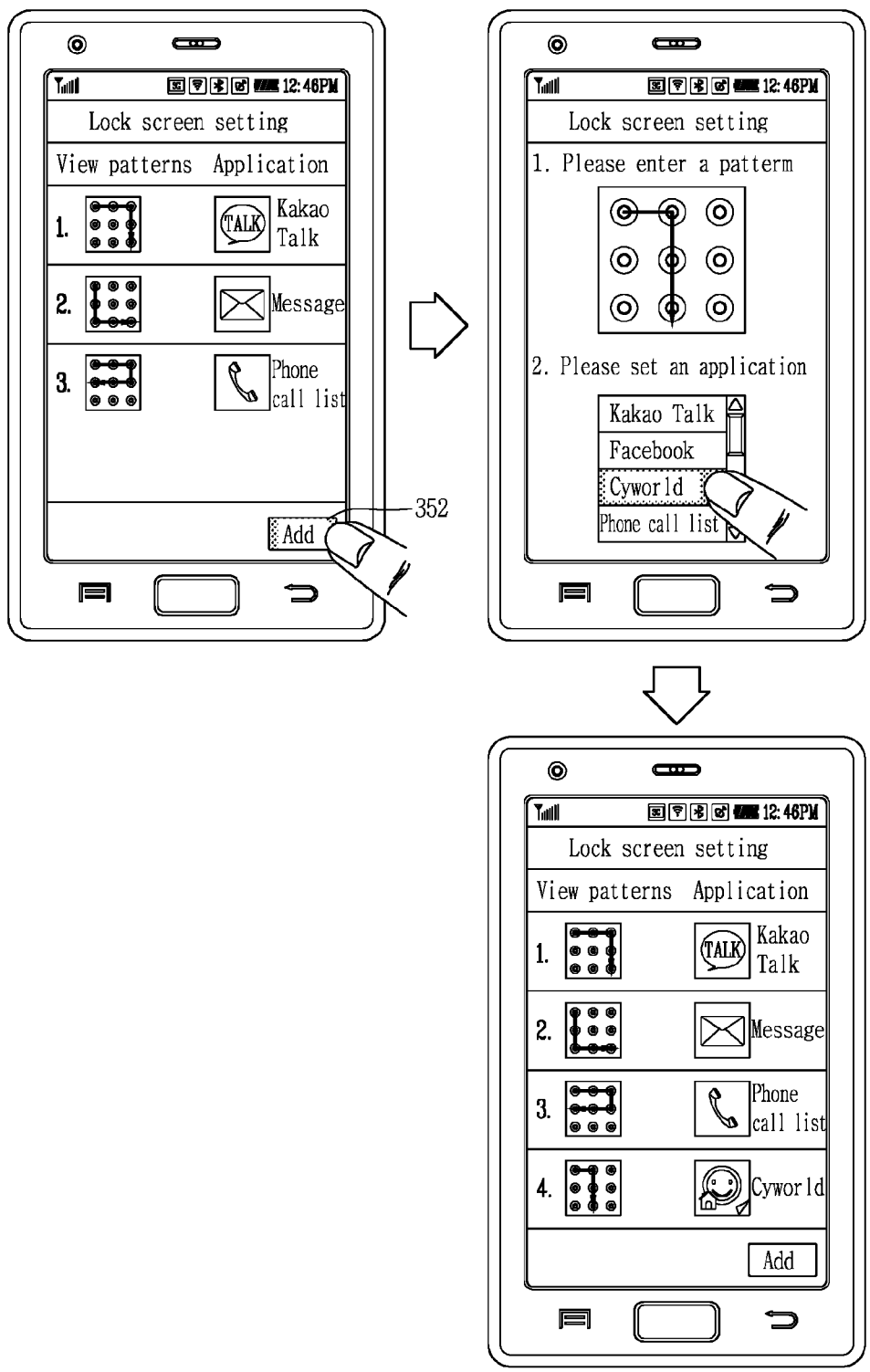
FIG. 9 is a conceptual view illustrating a method of setting a pattern for releasing a lock state in a mobile terminal according to an embodiment disclosed in the present disclosure.

FIG. 9 is a conceptual view illustrating a method of setting a pattern for releasing a lock state in a mobile terminal according to an embodiment disclosed in the present disclosure.

As illustrated in FIGS. 5A and 5B, a mobile terminal and control method thereof according to an embodiment of the present disclosure may activate an application associated with an object corresponding to a pattern while at the same time releasing a lock state using objects corresponding to a plurality of patterns, respectively.

On the other hand, the foregoing pattern may be set by the user, and an application corresponding to each pattern may be also selected by the user.

As illustrated in FIG. 9, the user can check preset patterns and objects corresponding to each pattern on a "lock screen setting" screen. Furthermore, if the user selects an "add" icon 352 to add a pattern, then the controller 180 displays a window for setting the pattern.

Accordingly, the user can enter a pattern having a desired path in the "1. enter a pattern" region and set an application corresponding to the entered pattern in the "2. set application" region.

For example, as illustrated in the drawing, if an application "Cyworld" is set to a " ⌐ "-shaped pattern by the user, then the controller 180 matches the pattern set by the user to the application, and then adds the " ⌐ "-shaped pattern to a pattern for releasing a lock screen.

Accordingly, as illustrated in the drawing, a newly set pattern and application will be displayed at No. 4 on the list.

Objects corresponding to the patterns and applications included in Nos. 1 through 4 on the list may be displayed on the lock screen.

As described above, a mobile terminal and control method according to an embodiment of the present disclosure may receive a plurality of patterns and applications from the user, thereby directly entering a user's desired application in a lock state.

A mobile terminal and control method according to an embodiment of the present disclosure may directly enter an application while at the same time releasing a lock state, thereby reducing inconvenience that a user should additionally select an application in an activated state.

Furthermore, a mobile terminal and control method according to an embodiment of the present disclosure may display a plurality of application icons that can be entered may be displayed on a lock screen, thereby providing information on the applications to the user.

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
a display unit configured to display a lock screen in a lock state in which a control command input to an application is restricted; and
a controller configured to:
   display a start position and an end position to unlock the lock screen;
   detect a user's touch input from the start position to one position of a first position or a second position which is different from the first position, the first position and the second position being an intermediate position in a path from the start position to the end position and being different from the start position and the end position;
   display screen information corresponding to the one position on the lock screen while in the lock state,
   wherein in response to the user's touch input being detected on the first position, a display window including information on events associated with received messages for applications in the mobile terminal is displayed, and
   wherein in response to the user's touch input being detected on the second position, a plurality of application icons is displayed, each application icon having an associated application;
   determine whether the user's touch input moves from the one position to a third position, the third position being different from the end position; and
   in response to determining that the third position is located on one of the displayed application icons, display an execution screen for the application corresponding to the one of the plurality of application icons.

2. The mobile terminal of claim 1, wherein the user's touch input includes a first touch input from the start position to the first position or the second position and a second touch input from the first position or the second position to the third position, and the path from the start position to the third position is a preset path for releasing the lock state.

3. The mobile terminal of claim 2, wherein the first touch input includes a drag input from the start position to the first position or the second position.

4. The mobile terminal of claim 2, wherein the second touch input is a touch input sequentially entered from the first touch input to a release point for generating an unlock command to release the lock state, and the first and the second touch input are applied on the preset path for releasing the lock state.

5. The mobile terminal of claim 4, wherein a plurality of objects are displayed at release points included in a plurality of paths, respectively.

6. The mobile terminal of claim 1, wherein the controller sets a condition for displaying the execution screen when a kind of application corresponding to the displayed application icon corresponds to set criteria.

7. The mobile terminal of claim 6, wherein the condition is an input of a preset number or preset touch.

8. The mobile terminal of claim 1, further comprising:
a detection unit configured to detect a displayable application icon on the lock screen,
wherein the detection unit detects an application icon corresponding to any one of an application in which an event has occurred during the lock state, an application that has been executed prior to entering the lock state, a preset application to be displayed on the lock state, and an application being executed in the lock state, based on set criteria.

9. A of controlling a mobile terminal configured to display a lock screen in a lock state in which a control command input to an application is restricted, the method comprising:
displaying a start position and an end position to unlock the lock screen;
detecting a user's touch input from the start position to one position of a first position or a second position which is different from the first position, the first position and the second position being an intermediate position in a path from the start position to the end position and being different from the start position and the end position;
displaying screen information corresponding to the one position on the lock screen while in the lock state,
wherein in response to the user's touch input being detected on the first position, a display window including information on events associated with received messages for applications in the mobile terminal is displayed, and
wherein in response to the user's touch input being detected on the second position, a plurality of application icons is displayed, each application icon having an associated application;
determining whether the user's touch input moves from the one position to a third position, the third position being different from the end position; and
in response to determining that the third position is located on one of the displayed application icons, display an execution screen for the application corresponding to the one of the plurality of application icons.

10. The method of claim 9, further comprising an end position,
wherein the path from the start position to the end position is a preset path for releasing the lock state without an execution screen.

11. The method of claim 10, wherein there exist a plurality of preset paths, and the plurality of application icons are located on the plurality of paths, respectively, and the execution screen corresponds to an application icon located on a path at which the touch input is sensed among the plurality of paths.

* * * * *